US007013653B2

(12) United States Patent
Kamiya et al.

(10) Patent No.: US 7,013,653 B2
(45) Date of Patent: Mar. 21, 2006

(54) SEAT AIR CONDITIONER FOR VEHICLE AND SEAT STRUCTURE

(75) Inventors: Toshifumi Kamiya, Takahama (JP); Shinji Aoki, Chiryu (JP)

(73) Assignee: DENSO Corporation, Kariya (JP)

( * ) Notice: Subject to any disclaimer, the term of this patent is extended or adjusted under 35 U.S.C. 154(b) by 5 days.

(21) Appl. No.: 10/755,255

(22) Filed: Jan. 9, 2004

(65) Prior Publication Data

US 2004/0139758 A1 Jul. 22, 2004

(30) Foreign Application Priority Data

Jan. 14, 2003 (JP) ............................ 2003-005397

(51) Int. Cl.
*F25B 21/02* (2006.01)

(52) U.S. Cl. ............................ 62/3.61; 62/244; 62/261

(58) Field of Classification Search .................. 62/3.5, 62/3.61, 244, 261

See application file for complete search history.

(56) References Cited

U.S. PATENT DOCUMENTS 3,550,523 A * 12/1970 Irving ........................ 454/120
5,597,200 A 1/1997 Gregory et al.
5,715,695 A * 2/1998 Lord ......................... 62/259.3
5,921,100 A * 7/1999 Yoshinori et al. ............. 62/244
6,059,018 A * 5/2000 Yoshinori et al. ............. 165/42
6,079,485 A * 6/2000 Esaki et al. ................... 165/43
6,179,706 B1 1/2001 Yoshinori et al.
6,224,150 B1 5/2001 Eksin et al.
6,478,369 B1 11/2002 Aoki et al.
RE38,128 E * 6/2003 Gallup et al. ................. 62/3.5

* cited by examiner

*Primary Examiner*—William E. Tapolcai
(74) *Attorney, Agent, or Firm*—Harness, Dickey & Pierce, PLC

(57) ABSTRACT

A seat air conditioner for a vehicle seat includes a seat air passage that is provided in at least one of a seat back and a seat cushion having a seat surface and a pad covered by the seat surface. The seat air conditioner further includes a blower unit disposed at a back side of the pad. The seat air passage has an air distribution passage embedded within the pad and a connection hole passage extending from a predetermined portion in the air distribution passage to the blower unit. The air distribution passage extends in a surface direction in a pipe shape to have a predetermined pattern. Since the air distribution passage is provided inside the pad, seat surfaces of the seat cushion and the seat back can be made smooth, and comfortable seating feeling can be given to a user.

16 Claims, 10 Drawing Sheets

SEAT AIR CONDITIONER FOR VEHICLE AND SEAT STRUCTURE

CROSS-REFERENCE TO RELATED APPLICATION

This application is related to Japanese Patent Application No. 2003-5397 filed on Jan. 14, 2003, the content of which is hereby incorporated by reference.

BACKGROUND OF THE INVENTION

1. Field of the Invention

The present invention relates to a seat air conditioner for a vehicle, which has an air passage in a seat cushion of a vehicle seat and blows conditioned air from a seat surface of the vehicle seat through the air passage. More particularly, the present invention relates to a seat structure with the seat air conditioner.

2. Description of Related Art

In a seat air conditioner for a vehicle disclosed in U.S. Pat. No. 6,179,706 (corresponding to JP-A-2000-152849), as shown in FIG. 10, a vehicle seat 101 includes a seat cushion 102 as a seat part and a seat back 103 as a backrest part. Each of the seat cushion 102 and the seat back 103 includes a cushion having a pad 105 used as a support member, and a seat surface 106 covering the pad 105 at its face side. A seat air passage 400 and a blower unit 410 are provided in each of the seat cushion 102 and the seat back 103. Conditioned air is blown from each blower unit 410, and is blown from a surface of each cushion through each seat air passage 400, so that comfortable feeling can be given to a passenger sitting on the vehicle seat 101. In this seat air conditioner, the seat air passage 400 has an air distribution passage 500 that is formed into a ditch shape to be recessed from a face surface of the pad 105.

However, when the air distribution passage 500 is provided on the face surface of the pad 105 to be recessed from the face surface of the pad 105 in the ditch shape, the seat surface 106 is uneven due to the air distribution passage 500. Therefore, uncomfortable feeling may be given to a passenger seated on the vehicle seat 101. For example, unstable feeling may be given to the passenger hip on the vehicle seat 101. Further, dents are generated on the seat surface 106 due to the air distribution passage 500, thereby worsening a design appearance of the vehicle seat 101. Furthermore, a recessed suspension ditch (engagement ditch) is generally provided on the pad 105 to fix the seat surface 106. Therefore, an arrangement of the air distribution passage 500 is restricted inside the suspension ditch, in order to prevent interference between the suspension ditch and the air distribution passage 500.

SUMMARY OF THE INVENTION

In view of the above problem, it is an object of the present invention to provide a seat air conditioner for a vehicle capable of improving its air conditioning performance while improving a seating feeling of a vehicle seat and a design appearance of the vehicle seat.

According to an aspect of the present invention, a seat air conditioner for a vehicle seat includes a seat air passage provided at least in a seat cushion of the vehicle seat, and a blower unit disposed for blowing air in the seat air passage from a seat surface of the seat cushion or for sucking air from the seat surface into the seat air passage. In the seat air conditioner, the seat air passage has an air distribution passage embedded within a pad of the seat cushion, covered by the seat surface, and a connection hole passage extending from a predetermined portion in the air distribution passage to the blower unit. Further, the air distribution passage extends inside the pad in a surface direction in a predetermined pattern, and the connection hole passage penetrates through a lower surface of the seat cushion to communicate with the blower unit.

Thus, air blown by the blower unit can be supplied to a wider area of the pad through the air distribution passage provided in the pad, and the air can be smoothly distributed from a surface of the pad to the outside of the seat cushion through the seat surface of the seat cushion. Therefore, a seat air conditioning can be effectively performed for a passenger seated on the vehicle seat. Further, because the air distribution passage is provided inside the pad, the surface of the pad can be made smooth without an uneven portion. Accordingly, seating feeling given to the passenger on the vehicle seat and a design appearance of the vehicle seat can be also improved. Accordingly, even when the pad has a suspension ditch at which the seat surface is engaged with and is fixed to the pad, the air distribution passage can extend in the surface direction from an inside of the suspension ditch to an outside of the suspension ditch. In this case, an air blowing area from the seat surface can be further enlarged.

Preferably, the seat air passage further includes a plurality of branch hole passages extending from predetermined set portions in the air distribution passage to a surface of the pad or to a position in the pad, proximate to the surface of the pad. Accordingly, air blowing capacity from the seat surface can be effectively improved even when the pad has a low air permeability. Generally, the branch hole passages extends in a direction substantially perpendicular to the surface direction, to be separated from each other in an extending direction of the air distribution passage. Further, a cover member having low air permeability can be disposed above a top end opening of the connection hole passage of the pad. In this case, air can be more uniformly blown from the seat surface in a wide area.

More preferably, the pad is divided into a first portion and a second portion in a direction perpendicular to the surface direction, at a portion where the air distribution passage is provided. Therefore, the first and second portions of the pad can be made of different materials. A division surface between the first portion and the second portion can be provided at an upper end position of the air distribution passage, a lower end position of the air distribution passage or a position between the upper end position and the lower end position in the direction perpendicular to the surface direction.

Further, the first and second portions of the pad have connection surfaces, respectively, that are connected to each other to form the pad, the first portion has a recess portion recessed from the connection surface, and the second portion has a projection protruding from the connection surface to be engaged with the recess portion. In this case, it can prevent the first portion and the second portion from being shifted from each other in the surface direction.

According to another aspect of the present invention, a seat structure provided in at least one of a seat cushion and a seat back of a seat includes a pad used as a supporting member and having an air passage through which air flows, a seat surface on a face side of the pad, on which a user is seated, and a blower unit for blowing air from the seat surface through the air passage. In the seat structure, the air passage includes an air distribution passage embedded in the pad to extend substantially in a surface direction in a pipe shape having a predetermined pattern, and a connection hole passage extending from a predetermined portion in the air distribution passage to the blower unit. Thus, comfortable seating feeling can be given to a user on the seat while seat air conditioning can be effectively performed.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described herein after with reference to the accompanying drawings.

(First Embodiment)

Figure 1:
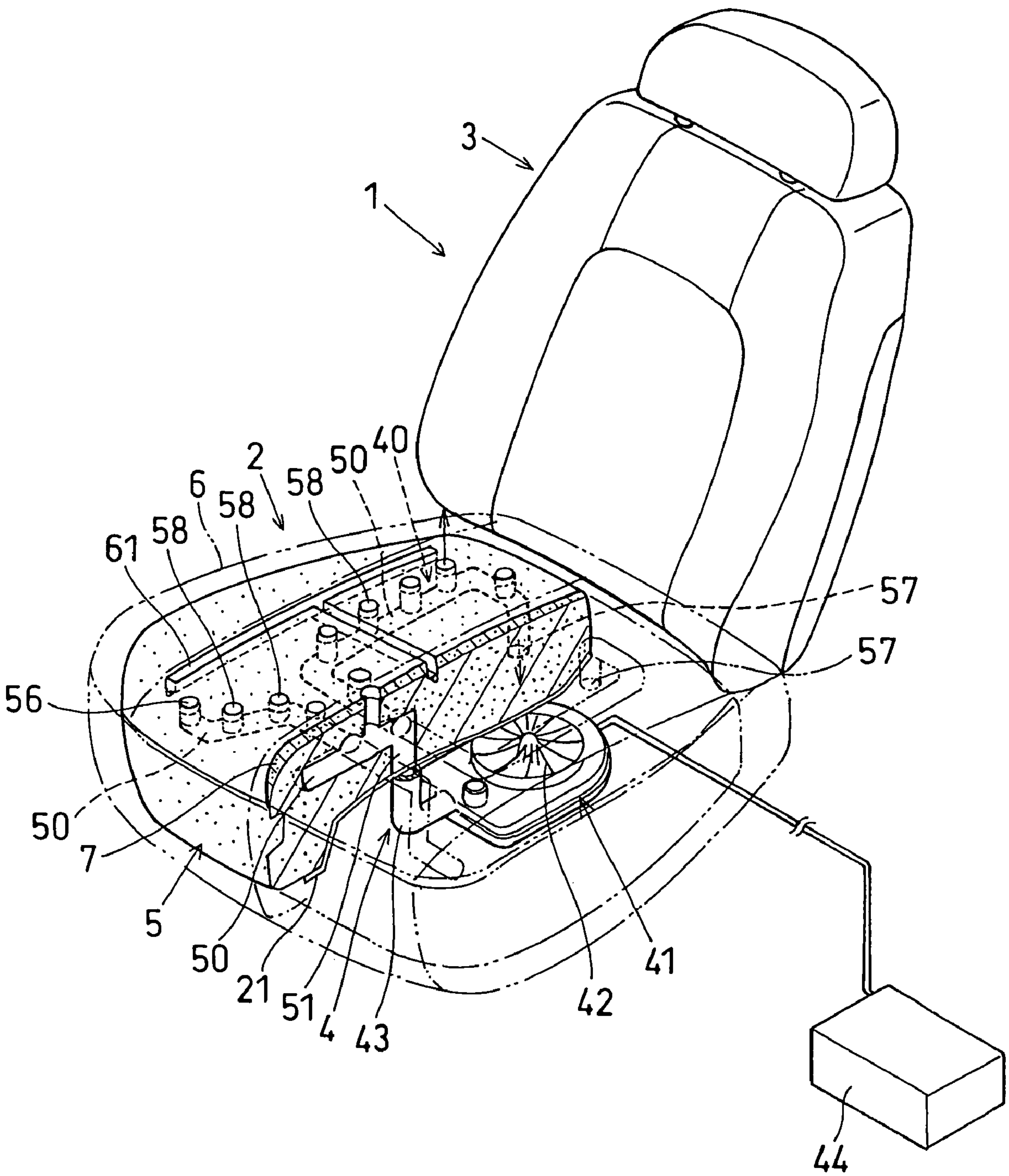
FIG. 1 is a perspective view showing a vehicle seat provided with a seat air conditioner according to a first embodiment of the present invention.
Figure 2:
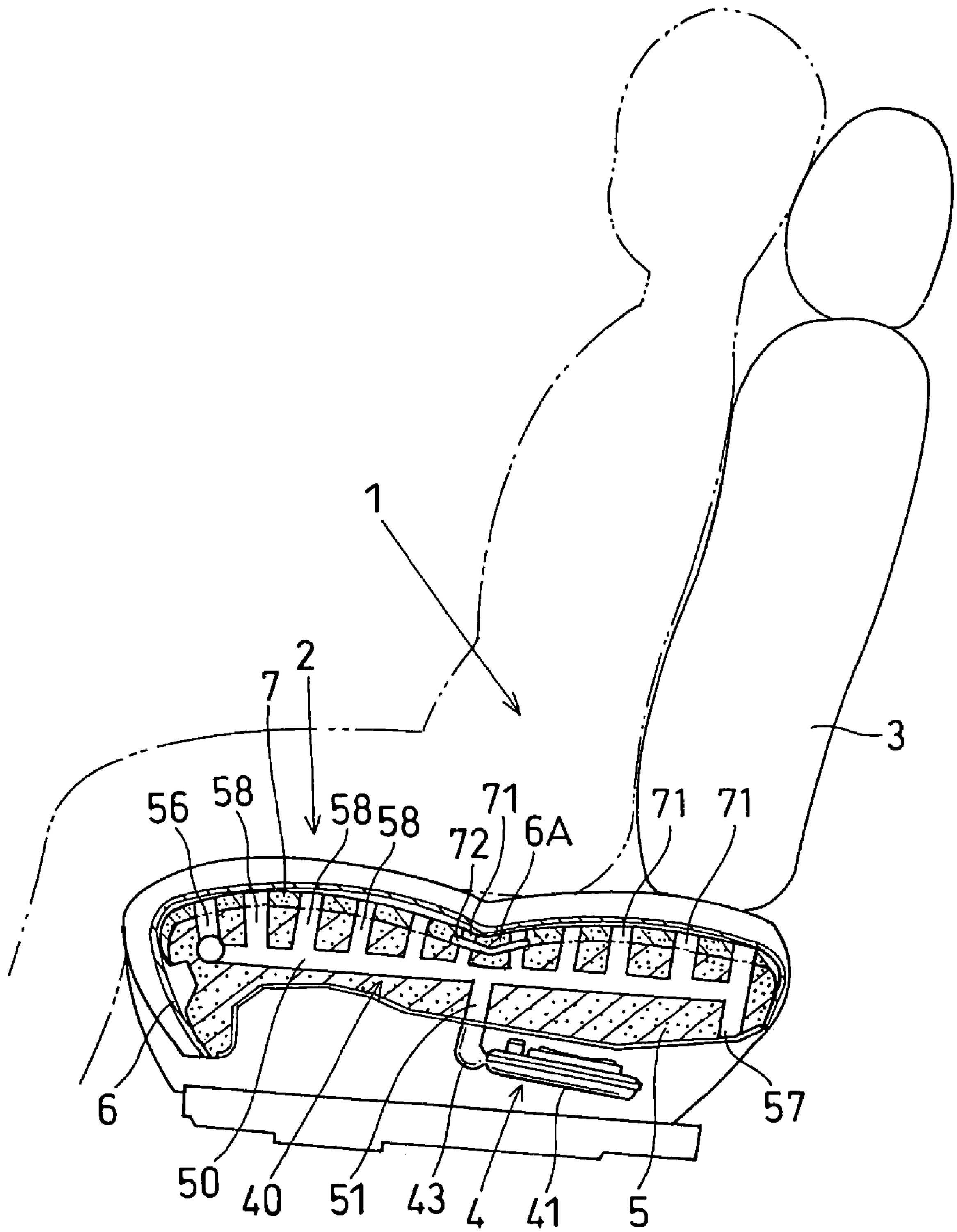
FIG. 2 is a schematic sectional view showing the vehicle seat provided with the seat air conditioner according to the first embodiment.
Figure 3:
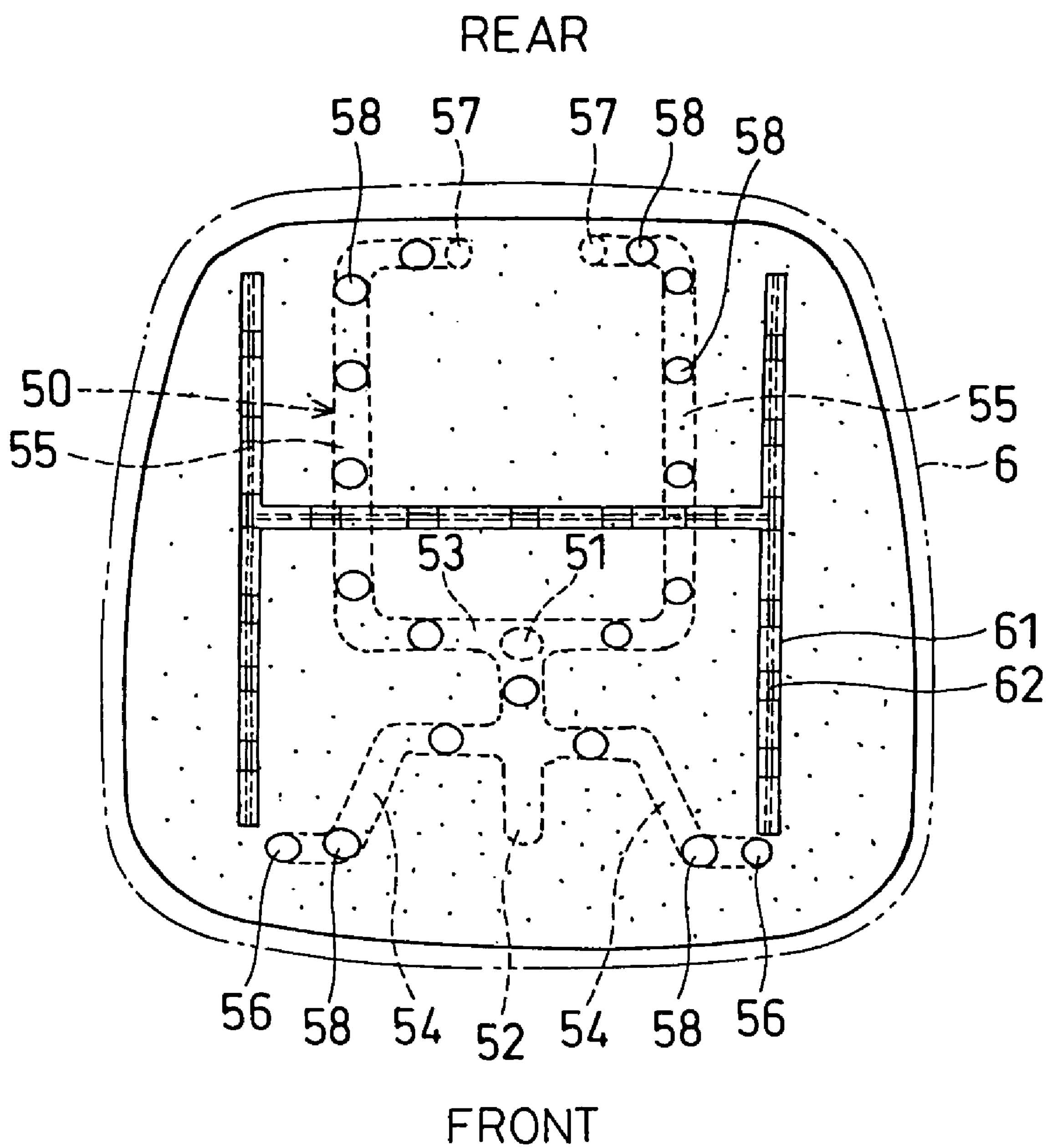
FIG. 3 is a plan view showing the vehicle seat provided with the seat air conditioner according to the first embodiment.

The first embodiment of the present invention will be now described with reference to FIGS. 1–3. As shown in FIG. 1, a vehicle seat 1 used as a front seat of the vehicle includes a seat cushion 2 as a seat part for receiving the hip portion of a passenger and the thigh portion of the passenger, and a seat back 3 used as a backrest for receiving the waist portion of the passenger and the back of the passenger. A seat air conditioner 4 is provided in the seat cushion 2. The seat cushion 2 includes a pad 5 made of an urethane resin. The pad 5 is used as a support member of the seat cushion 2 and is arranged on a spring plate 21 used as an attachment seat. An H-shaped suspension ditch 61 is provided on the pad 5, and a spring bar 62 is intermittently embedded in the pad 5 on a bottom portion of the suspension ditch 61 to be fixed to the bottom portion of the suspension ditch 61. Plural suspension strips are attached to a back face of a seat surface 6, and are engaged with an exposed portion of the spring bar 62. In the first embodiment, an additional pad 7 made of a soft foam material (porous member) is disposed on the pad 5 to improve the seating feeling of the passenger, and is covered by the seat surface 6. The additional pad 7 can be eliminated in some usages of the vehicle seat 1, or in some materials of the pad 5 and the seat surface 6.

The seat air conditioner 4 includes an air passage 40 provided inside the pad 5 and a blower unit 41 attached to a lower face of the spring plate 21. The air passage 40 has an air distribution passage 50 that approximately horizontally extends in a front-rear direction and a right-left direction (i.e., width direction), with a predetermined pattern. In the first embodiment, as shown in FIG. 3, the air distribution passage 50 has a connection hole passage 51, a longitudinal air passage 52 and a lateral air passage 53. The connection hole passage 51 penetrates through the seat cushion 2 downwardly at an approximate center portion of the seat cushion 2. The longitudinal air passage 52 extends from the connection hole passage 51 to a front side in the front-rear direction, and the lateral air passage 53 extends from the connection hole passage 51 to right and left sides. The connection hole passage 51, the longitudinal air passage 52 and the lateral air passage 53 are provided to form approximately a T-shaped center portion of the air distribution passage 50. The sectional shape of the air distribution passage 50 can be formed into a circle shape, a polygon shape such as a rectangle, and the other pipe shape.

Front air passages 54 of the air distribution passage 50 extend from a portion in the longitudinal air passage 52 to right and left sides in the width direction by right angle with respect to the longitudinal air passage 52, and are bent by an angle of substantially 45 degrees toward the front side. The front air passages 54 are further bent to extend outside in the right and left direction, and its extending tip ends are provided with end openings 56 that extend to be opened on the upper surface (face surface) of the seat cushion 2. Further, rear air passages 55 of the air distribution passage 50 extend from right and left ends of the lateral air passage 53 to the rear side, and are bent to an inner side in the width direction. Extending tip ends of the rear air passages 55 are provided with end openings 57 that extend to be opened on a lower surface (back surface) of the seat cushion 2.

In the first embodiment, plural branch hole passages 58 are provided in the pad 5 at predetermined important positions in the air distribution passage 50, respectively. As shown in FIG. 2, the additional pad 7 has therein plural through holes 71 which are provided to communicate with a back surface of the seat surface 6 and to correspond to the arrangement positions of the plural branch hole passages 58. When the pad 5 and the additional pad 7 are made of a material having low air permeability, the branch hole passages 58 and the through holes 71 need to be provided. In this case, conditioned air can be smoothly blown from the blower unit 41 to the seat surface 6, through the branch hole passages 58 and the through holes 71.

When the additional pad 7 is made of a material having a high air permeability, the through holes 71 are not required. Further, when the pad 5 is made of a material having a high air permeability, the branch hole passages 58 are not required. Even in this case, air introduced into the air distribution passage 50 from the blower unit 41 can be blown from the seat surface 6 through the pad 5 and the additional pad 7 having the high air permeability. When the seat surface 6 is made of a material having low air permeability such as kip, the seat surface 6 is required to have plural ventilation holes. On the other hand, when the seat surface 6 is made of a material having high permeability such as moquette, the seat surface 6 is not required to have ventilation holes. Generally, air is blown from a blowing port 43 of a centrifugal blower 42 of the blower unit 41 to an upper position 6A positioned above the connection hole passage 51, and the air blown from the centrifugal blower 42 is readily collected to the upper position 6A. Thus, preferably, as shown in FIG. 2, a cover 72 made of a sheet material having a low air permeability is disposed to cover the upper position 6A. In this case, conditioned air can be more uniformly blown from the entire surface of the seat cushion 2.

The blower unit 41 includes the centrifugal blower 42, and the blowing port 43 of the blower 42 communicates with the connection hole passage 51. The blower unit 41 is controlled by an air conditioning control unit 44. Air blown by the blower unit 41 flows from the connection hole passage 51 to the front air passages 54 and the rear air passages 55 through the longitudinal air passage 52 and the lateral air passage 53. Most of the air from the blower unit 41 is blown from the surface of the seat cushion 2 through the branch hole passages 58 and the through holes 71. The residual part of the air from the blower unit 41 is blown from the end openings 56, 57 at the tip ends of the front air passages 54 and the rear air passages 55.

According to the first embodiment of the present invention, the seat air conditioner includes the air distribution passage 50 provided inside the pad 5 of the seat cushion 2. The air distribution passage 50 is embedded in the pad 5 to extend substantially in a surface direction of the seat surface 6 to have a predetermined pattern. The connection hole passage 51 extends from a predetermined portion in the air distribution passage 50, and penetrates through the back surface of the seat cushion 2 to communicate with the blowing port 43 of the centrifugal blower 42 of the blower unit 41. Thus, air blown by the blower unit 41 can be supplied to an entire area of the air distribution passage 50 of the pad 5, and the air is smoothly blown to the passenger on the seat cushion 2 through the seat surface 6. Because the air distribution passage 50 is provided to be embedded in the pad 5, the surface of the pad 5 can be made uniform. Further, the branch hole passage 58 are provided at predetermined important positions of the air distribution passage 50 to be separated from each other. Therefore, the seating feeling of the passenger on the seat cushion 2 is not deteriorated due to the branch hole passage 58.

For example, when the pad 5 is made of a material having a low air permeability, the branch hole passages 58 are provided to extend from the important portions in the air distribution passage 50 to the face surface of the pad 5 or to a portion proximate to the face surface of the pad 5. Therefore, air can be smoothly supplied to the seat surface of the seat cushion 2. Further, the additional pad 7 can be arranged between the pad 5 and the seat surface 6. In this case, the branch hole passages 58 can be provided to extend to the upper surface of the additional pad 7 in accordance with the air permeability of the additional pad 7.

The extending tip ends of the air distribution passage 50 are provided with the end openings 56, 57 that are opened to one of the surface of the pad 5, the upper surface of the seat cushion 2, the side surface of the seat cushion 2 and the lower surface of the seat cushion 2. Therefore, air can be uniformly supplied to the seat surface from the entire area of the air distribution passage 50.

In the first embodiment, even in a case where the branch hole passages 58 extend to the upper surface (face surface) of the pad from the air distribution passage 50, because each opening sectional area of the branch hole passages 58 is relatively small and the branch hole passages 58 are partially provided in the air distribution passage 50 to be separated from each other, the seating feeling given to the passenger on the vehicle seat 1 can be improved. In FIG. 3, each passage sectional shape of the branch hole passages 58 is approximately round. However, the passage sectional shape of the branch hole passages 58 can be formed into the other passage shape such as an approximate rectangular.

(Second Embodiment)

Figure 4:
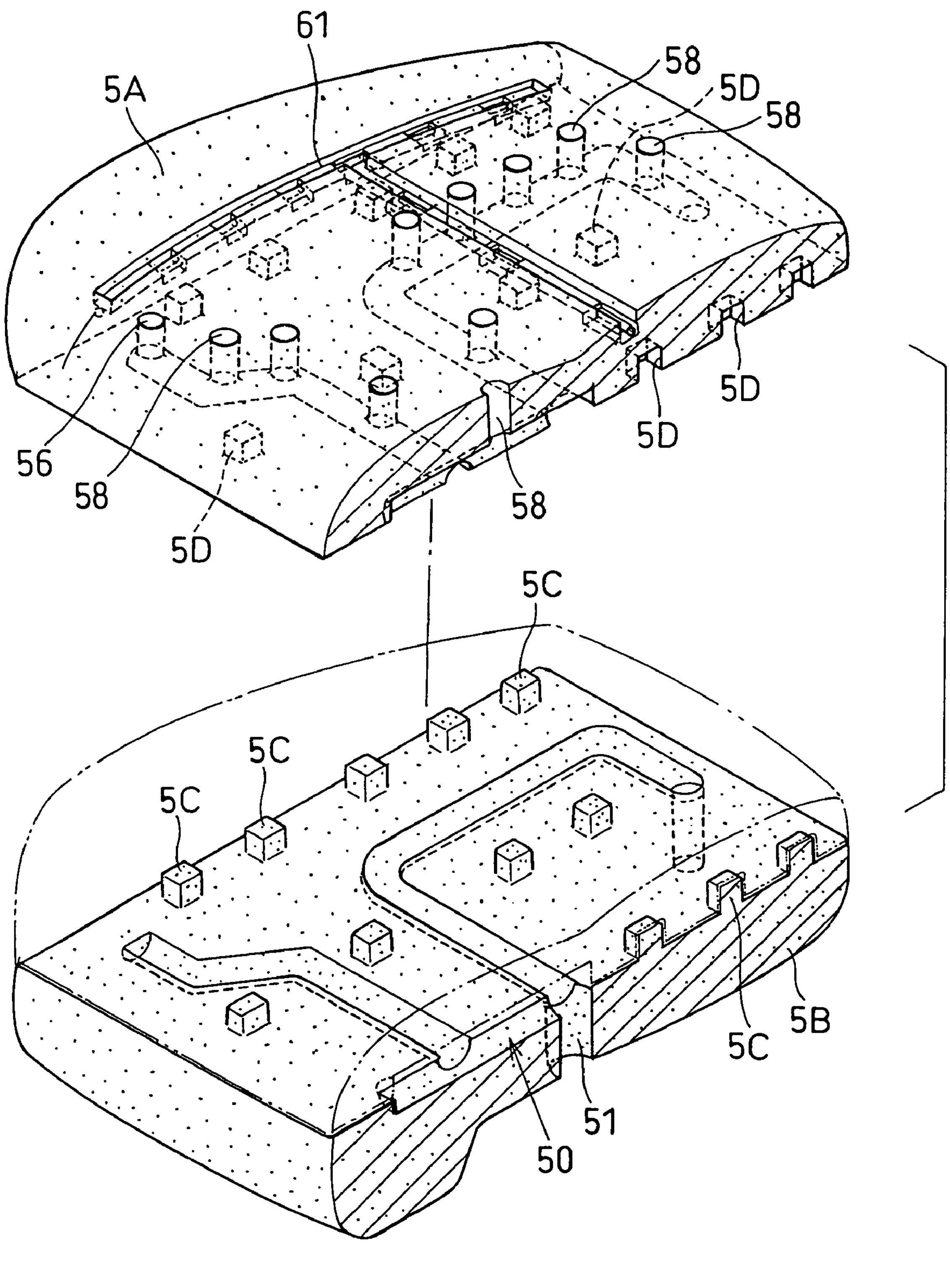
FIG. 4 is a disassembled perspective view showing a cushion (pad) for a vehicle seat according to a second embodiment of the present invention.

The second embodiment of the present invention will be now described with reference to FIG. 4. In the second embodiment, as shown in FIG. 4, in view of the manufacturing point of the pad 5, the pad 5 is divided into a face pad portion 5A (upper pad portion) and a back pad portion 5B (lower pad portion) at a center of the circular cross-section of the air distribution passage 50 in an up-down direction. The face and back pad portions 5A, 5B are molded indifferent from each other, and are combined together. Therefore, the face and back pad portions 5A, 5B can be readily removed from dice, and productivity of the pad 5 can be improved. Thus, the face pad portion 5A can be made of a material different from a material of the back pad portion 5B, and can be made of the same material as the back pad portion 5B. Therefore, the material characteristics of the face and back pad portions 5A and 5B, such as the hardness and air permeability can be set to be different from each other or can be set to be the same. Further, the division surface between the face pad portion 5A and the back pad portion 5B can be set at another position except for the center of the circular cross-section of the air distribution passage 50 in the up-down direction.

The face pad portion 5A has plural recess portions 5D recessed from its connection surface, and the back pad portion 5B has plural projection portions 5C protruding from its connection surface. The projection portions 5C are fitted into the recess portions 5D, so that the face pad portion 5A and the back pad portion 5B are connected on its connection surfaces. Thus, the connection strength between the face and back pad portions 5A, 5B is increased. Therefore, the face and back pad portions 5A, 5B can be prevented from being displaced from each other in a lateral direction when a passenger sits on or stands up from the vehicle seat 1. In the second embodiment, the other parts are similar to those of the above-described first embodiment.

(Third Embodiment)

Figure 5:
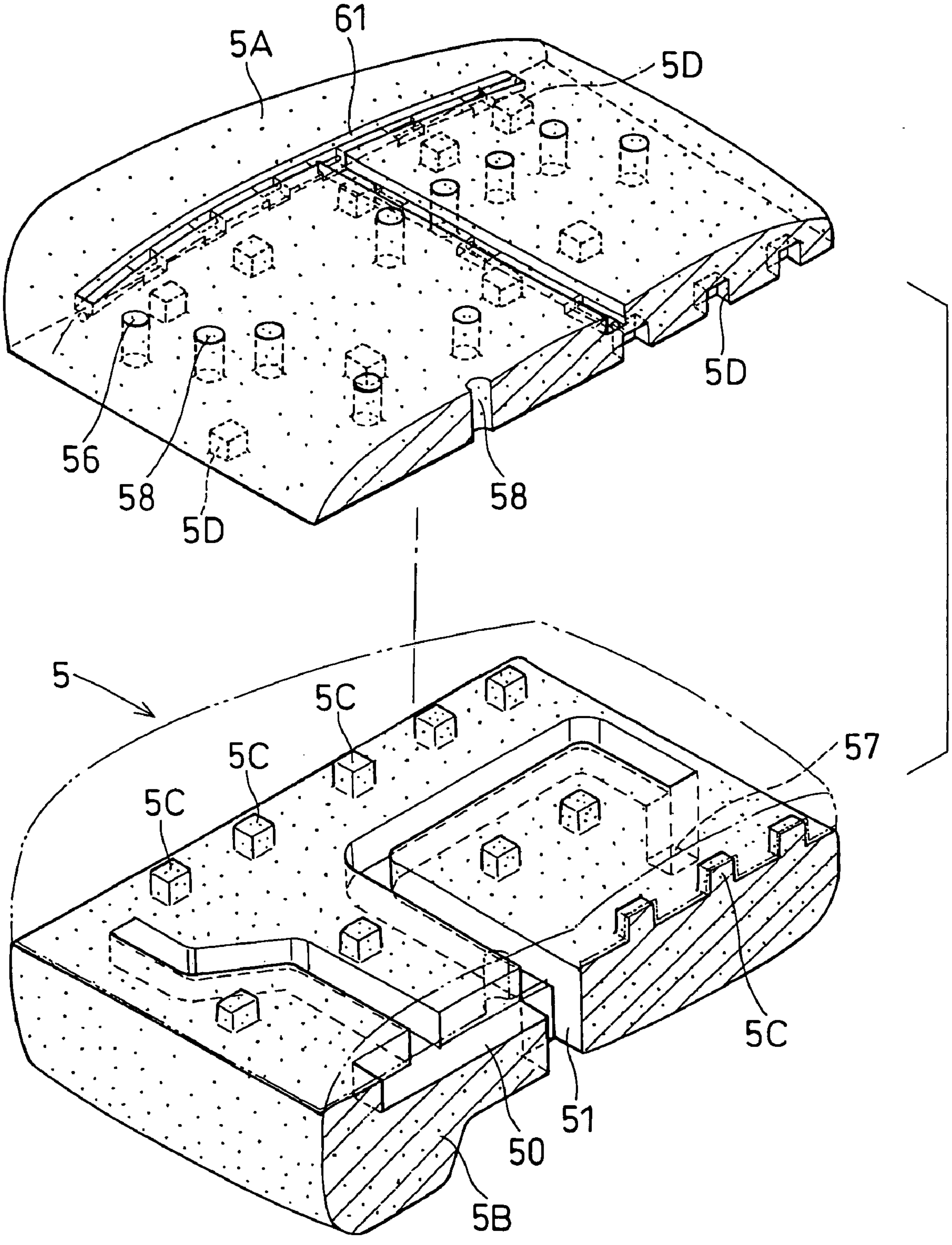
FIG. 5 is a disassembled perspective view showing a cushion (pad) for a vehicle seat according to a third embodiment of the present invention.

The third embodiment of the present invention will be now described with reference to FIG. 5. In the third embodiment, as shown in FIG. 5, the air distribution passage 50 has a rectangular shape in cross section. Similarly to the above-described second embodiment, the pad 5 is divided into a face pad portion 5A and a back pad portion 5B at an upper end position of the rectangular cross-section of the air distribution passage 50. In this way, the air distribution passage 50 is not required to be provided in the face pad portion 5A, thereby readily molding the face pad portion 5A. Further, the division surface (connection surface) between the face and back pad portions 5 may be provided at a lower end position of the rectangular cross-section of the air distribution passage 50, thereby obtaining the same operational effect as in the above case.

The face and back pad portions 5A, 5B are molded in different from each other, and are combined together. Therefore, the face pad portion 5A can be made of a material different from a material of the back pad portion 5B, and can be made of the same material as the backpad portion 5B. Therefore, the material characteristics of the face and back pad portions 5A and 5B, such as the hardness and air permeability can be made to be different from each other or can be set to be equal. Thus, the materials for forming the pad 5 can be readily selected, thereby improving molding performance of the pad 5 while maintaining comfortable seating feeling.

Further, similarly to the above-described second embodiment, the face pad portion 5A has plural recess portions 5D recessed from its connection surface, and the back pad portion 5B has plural projection portions 5C protruding from its connection surface. The projection portions 5C are fitted into the recess portions 5D, so that the face pad portion 5A and the back pad portion 5B are connected on its connection surfaces. Thus, the connection strength between the face and back pad portions 5A, 5B can be increased. Therefore, the face and back pad portions 5A, 5B can be prevented from being displaced from each other in the lateral direction when a passenger sits on or stands up from the vehicle seat 1.

In the third embodiment, the other parts are similar to those of the above-described first embodiment.

(Fourth Embodiment)

Figure 6:
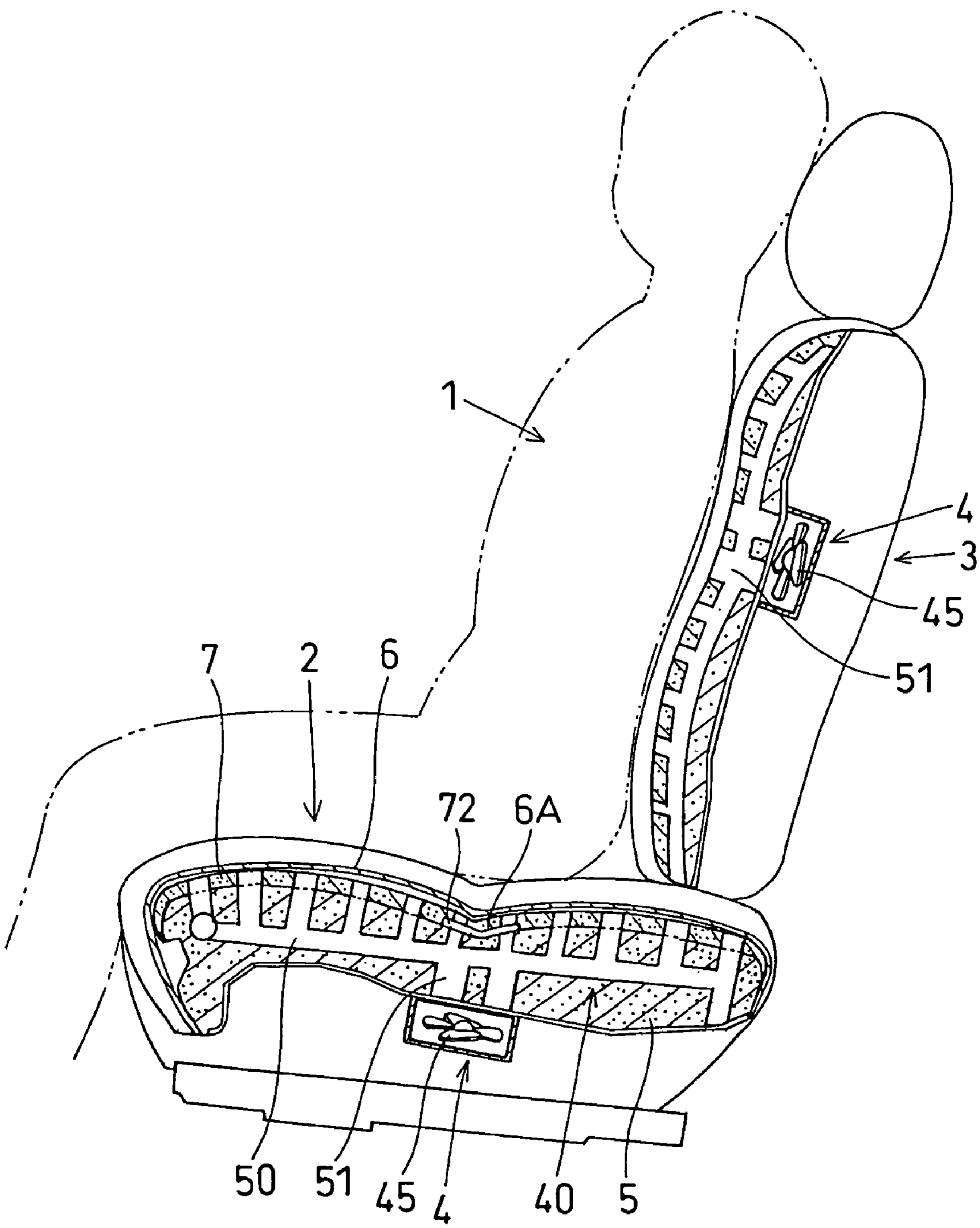
FIG. 6 is a schematic sectional view showing a vehicle seat provided with a seat air conditioner according to a fourth embodiment of the present invention.

In the fourth embodiment, as shown in FIG. 6, an axial flow blower 45 is used as a blower of the blower unit 41 in the structure of the seat air conditioner described in one of the first to third embodiments. Alternatively, air blown by a blower of a vehicle air conditioner can be introduced into the connection hole passage 51, or a suction type blower can be connected to the connection hole passage 51.

(Fifth Embodiment)

Figure 7:
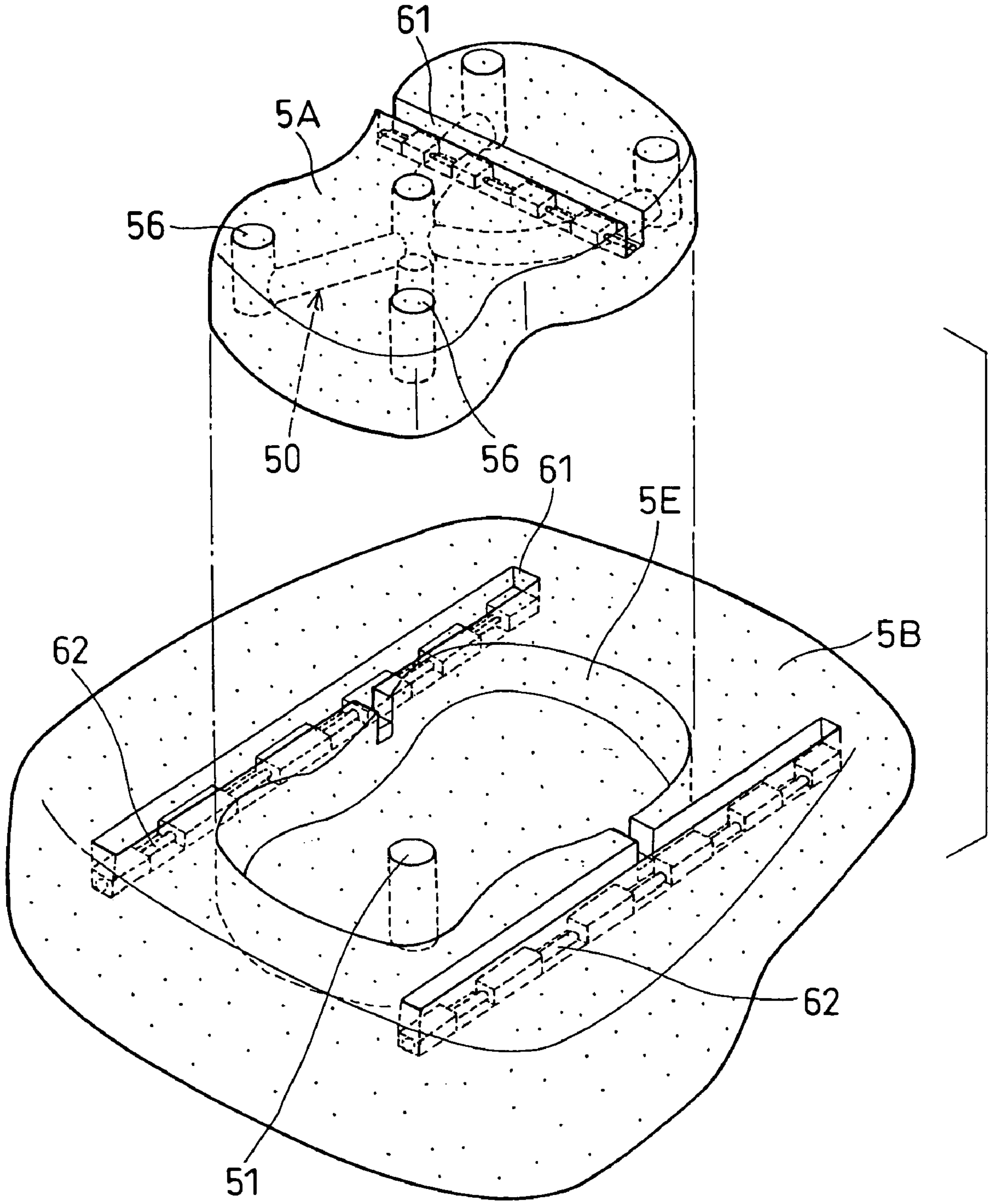
FIG. 7 is a disassembled perspective view showing a cushion (pad) of a vehicle seat according to a fifth embodiment of the present invention.

In the fifth embodiment, as shown in FIG. 7, a face pad portion 5A is provided only in a center area portion of the pad 5 at the upper side, and a back pad portion 5B has a recess portion 5E into which the face pad portion 5A is fitted. In this construction, since the face pad portion 5A is surely supported by the back pad portion 5B, the face and back pad portions 5A, 5B can be prevented from being displaced from each other in the lateral direction when the passenger sits on or stands up from the vehicle seat 1. The air distribution passage 50 having an approximate X shape is provided in the face pad portion 5A, thereby readily molding the face and back pad portions 5A, 5B.

In FIG. 7 of the fifth embodiment, the end openings 56 are provided at the extending tip ends of the air distribution passage 50. However, in the fifth embodiment, the branch hole passage 58 described in the above embodiments can be provided at predetermined positions in the air distribution passage 50 to extend to the face surface of the pad 5 or a position proximate to the face surface of the pad 5 in accordance with the permeability of the pad 5.

(Sixth Embodiment)

Figure 8:
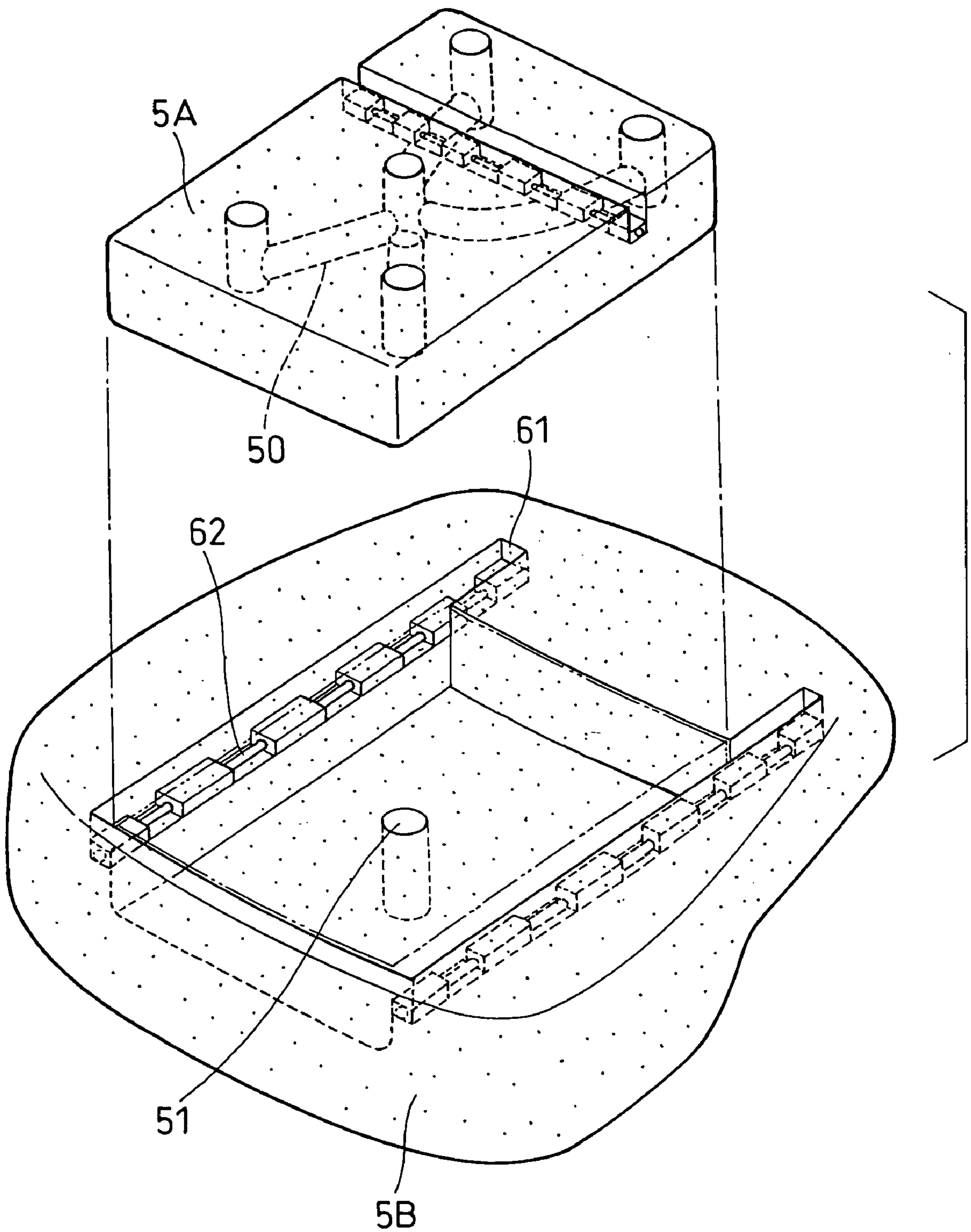
FIG. 8 is a disassembled perspective view showing a cushion (pad) for a vehicle seat according to a sixth embodiment of the present invention.

The sixth embodiment is a modification of the above-described fifth embodiment. In the sixth embodiment, as shown in FIG. 8, the face pad portion 5A is provided to reach an inner periphery of the suspension ditch 61 having a substantially H shape, thereby readily molding the face and back pad portions 5A, 5B while strengthening the face side structure of the pad 5. In this case, the shape of the face pad portion 5A and the recess portion 5E provided in the back pad portion 5B can be changed in accordance with the shape of the suspension ditch 61. In the sixth embodiment, the other parts are similar to those of the above-described fifth embodiment.

(Seventh Embodiment)

Figure 9:
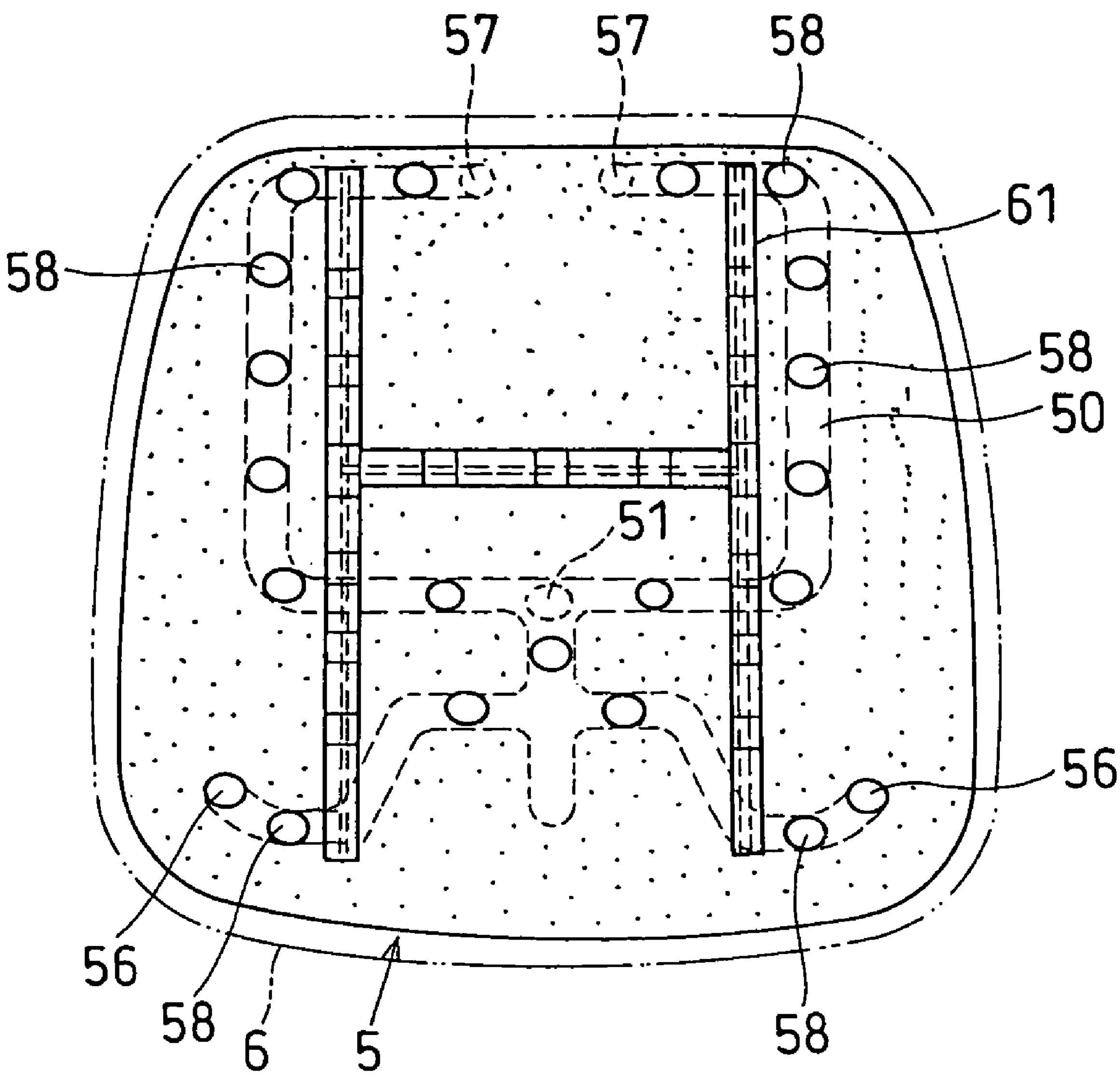
FIG. 9 is a plan view showing a cushion (pad) for a vehicle seat according to a seventh embodiment of the present invention.
Figure 10:
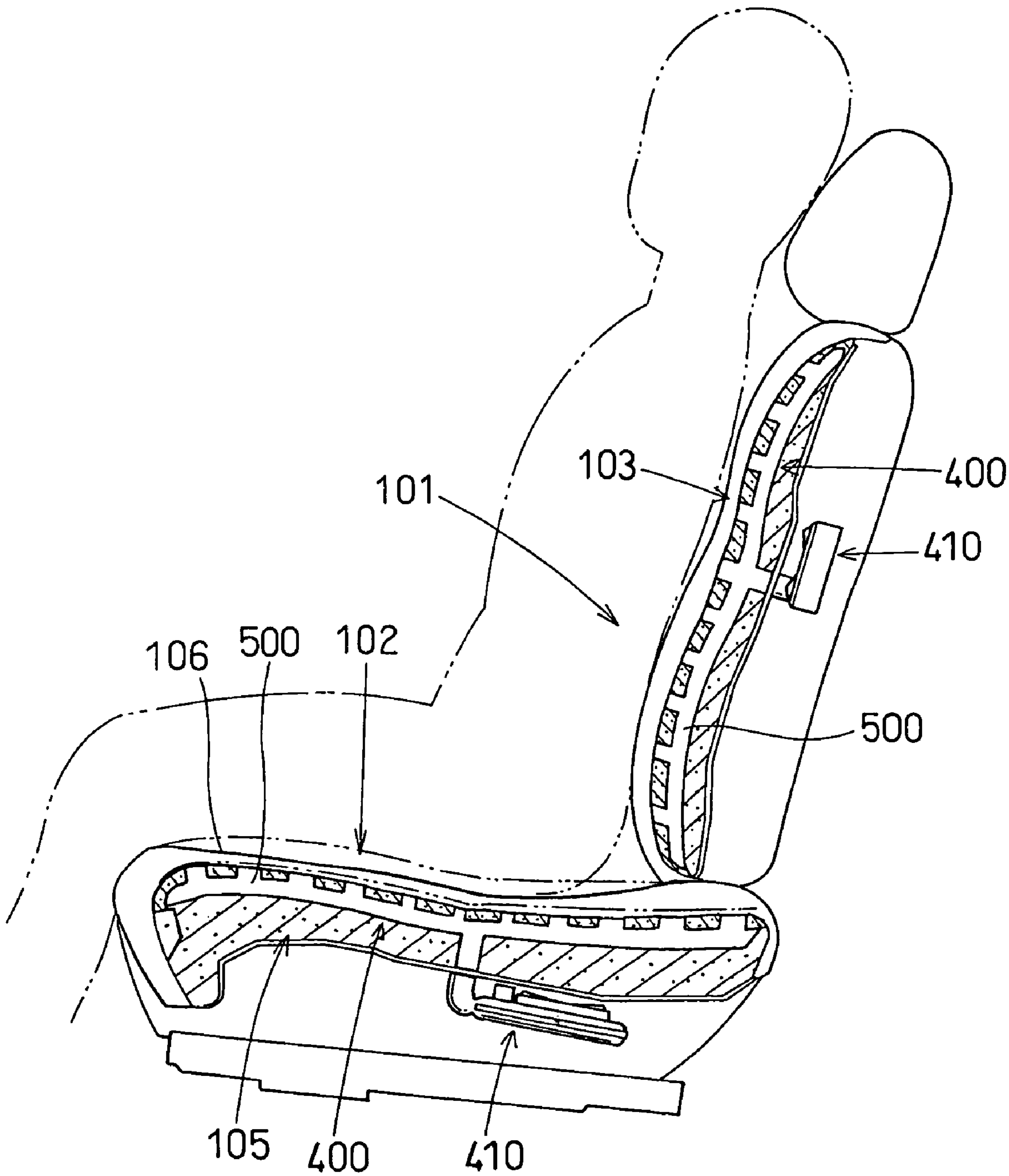
FIG. 10 is a schematic sectional view showing a vehicle seat provided with a seat air conditioner in a prior art.

The seventh embodiment of the present invention will be now described with reference to FIG. 9. In the seventh embodiment, as shown in FIG. 9, the air distribution passage 50 is provided to extend from an inside of the H-shaped suspension ditch 61 to an outside of the H-shaped suspension ditch 61. The air distribution passage 50 is provided within the pad 5 to be embedded in the pad 5, and the suspension ditch 61 is provided on the surface of the pad 5 above the air distribution passage 50. Therefore, even when the air distribution passage 50 is extended from the inside of the suspension ditch 61 to the outside of the suspension ditch 61 in the extending direction of the air distribution passage 50, an interference between the air distribution passage 50 and the suspension ditch 61 can be prevented. Thus, conditioned air can be blown from a wider surface of the pad 5 without being restricted by the suspension ditch 61. Further, the shape of the suspension ditch 61 is not limited to the H-shape, and can be changed.

In the seventh embodiment, the other pars are similar to those of the above-described first embodiment.

(Modifications)

Although the present invention has been fully described in connection with the preferred embodiments thereof with reference to the accompanying drawings, it is to be noted that various changes and modifications will become apparent to those skilled in the art.

For example, the seat air conditioner of the present invention described in the above embodiments can be used for the seat back 3, similar to the seat cushion 2. Further, the blower unit 41 may be a suction type blower unit for sucking air from the seat surface 6 into the air passage within the seat. In this case, the blower unit 41 sucks air from the seat surface 6 through the air distribution passage 50.

In the above-described embodiments of the present invention, the air distribution passage 50 can extend in a direction approximately parallel to the seat surface of the seat cushion 2 to have the other pattern different from the patterns of the above-described embodiments. Further, the cross-section shape of the air distribution passage 50 in a direction substantially perpendicular to the seat surface can be changed to other shapes.

In addition, any one of the above-described second, third, fifth and sixth embodiments can be combined with one of the above-described first, fourth and seventh embodiments.

Such changes and modifications are to be understood as being within the scope of the present invention as defined by the appended claims.

What is claimed is:

1. A seat air conditioner for a vehicle seat, comprising:

a seat air passage provided in a seat cushion of the vehicle seat; and a blower unit disposed for blowing air in the seat air passage from a seat surface of the seat cushion or for sucking air from the seat surface into the seat air passage, wherein:

the seat air passage has an air distribution passage embedded within a pad of the seat cushion, covered by the seat surface, and a connection hole passage extending from a predetermined portion in the air distribution passage to the blower unit;

the air distribution passage extends inside the pad in a surface direction in a predetermined pattern; and the connection hole passage penetrates through a lower surface of the seat cushion to communicate with the blower unit;

the pad has a suspension ditch at which the seat surface is engaged with and fixed to the pad;

at least a part of the air distribution passage is located below a bottom surface of the suspension ditch;

the pad has an inner wall surface defining a top part of the air distribution passage;

the inner wall surface is positioned below an upper surface of the pad to be embedded in the pad; and the air distribution passage has a pipe-shaped cross-section.

2. The seat air conditioner according to claim 1, wherein the seat air passage further includes a plurality of branch hole passages extending from predetermined set portions in the air distribution passage of the pad to a surface of the pad.

3. The seat air conditioner according to claim 1, wherein the seat air passage further includes a plurality of branch hole passages extending from predetermined set portions in the air distribution passage of the pad to positions in an additional pad of the seat cushion, proximate to a surface of the pad, the pad being disposed beneath the additional pad of the seat cushion, the additional pad being cooled by the seat surface.

4. The seat air conditioner according to claim 2, wherein the branch hole passages extends in a direction substantially perpendicular to the seat surface of the seat cushion, to be separated from each other in an extending direction of the air distribution passage.

5. The seat air conditioner according to claim 1, further comprising an end opening provided at an extending tip end of the air distribution passage in the direction substantially parallel to the surface of the seat cushion, wherein the end opening extends to communicate with one of a surface of the pad, an upper surface of the seat cushion, a side surface of the seat cushion and a lower surface of the seat cushion.

6. The seat air conditioner according to claim 1, further comprising a cover member having low air permeability, wherein the cover member is disposed above a top end opening of the connection hole passage of the pad.

7. The seat air conditioner according to claim 1, wherein the pad is divided into a first portion and a second portion in a direction perpendicular to the seat surface of the seat cushion, at a portion where the air distribution passage is provided.

8. The seat air conditioner according to claim 7, wherein:

the first and second portions have connection surfaces, respectively, that are connected to form the pad;

the first portion has a recess portion recessed from the connection surface; and the second portion has a projection protruding from the connection surface, to be engaged with the recess portion.

9. The seat air conditioner according to claim 7, wherein:

the second portion has a recess portion recessed from its upper surface;

the first portion is a center area portion in the pad on an upper side; and the first portion is inserted into the recess portion to form the pad.

10. The seat air conditioner according to claim 9, wherein:

the pad has a suspension ditch recessed from an upper surface of the pad; and the first portion contacts an inner periphery of the suspension ditch when the first portion is inserted into the recess portion in the second portion.

11. The seat air conditioner according to claim 7, wherein the first and second portions of the pad are made of different materials.

12. The seat air conditioner according to claim 7, wherein:

the pad has a plurality of branch hole passages extending from predetermined important positions in the air distribution passage to an upper surface of the pad;

through the branch hole passages, air introduced into the air distribution passage is blown from the seat surface of the seat cushion by the blower unit; and the air distribution passage is provided at least one of the first and second portions.

13. The seat air conditioner according to claim 7, wherein:

the first and second portions are molded while being separated from each other; and the first and second portions are connected together to form the pad.

14. The seat air conditioner according to claim 13, wherein:

the first and second portions have connection surfaces, respectively, that are connected with each other to form the pad;

one of the first portion and the second portion has a plurality of recess portions on the connection surface;

the other one of the first portion and the second portion has a plurality of projections protruding from the connection surface; and projections are fitted into the recess portions on the connection surfaces.

15. The seat air conditioner according to claim 1, wherein the air distribution passage extends below the suspension ditch from an inside of the suspension ditch to an outside of the suspension ditch in the surface direction.

16. The seat air conditioner according to claim 1, wherein:

the pad has a plurality of branch hole passages extending from predetermined important positions in the air distribution passage toward the upper surface of the pad; and through the branch hole passages, air introduced into the air distribution passage is blown from the seat surface of the seat cushion by the blower unit.

* * * * *